(12) United States Patent
Rudolph et al.

(10) Patent No.: US 11,987,133 B2
(45) Date of Patent: May 21, 2024

(54) INFINITELY ADJUSTABLE DRIVETRAIN

(71) Applicant: DEERE & COMPANY, Moline, IL (US)

(72) Inventors: Kirk Rudolph, Dubuque, IA (US); Jonathan Coulter, Glenpool, OK (US)

(73) Assignee: DEERE & COMPANY, Moline, IL (US)

( * ) Notice: Subject to any disclaimer, the term of this patent is extended or adjusted under 35 U.S.C. 154(b) by 287 days.

(21) Appl. No.: 17/364,534

(22) Filed: Jun. 30, 2021

(65) Prior Publication Data

US 2023/0001800 A1 Jan. 5, 2023

(51) Int. Cl.
*B60L 15/20* (2006.01)
*B60L 15/02* (2006.01)
*H02P 21/20* (2016.01)

(52) U.S. Cl.
CPC ............. *B60L 15/20* (2013.01); *B60L 15/025* (2013.01); *H02P 21/20* (2016.02); *B60L 2240/423* (2013.01); *B60L 2260/26* (2013.01)

(58) Field of Classification Search
CPC .... B60L 15/20; B60L 15/025; B60L 15/2054; B60L 2240/423; B60L 2260/26; H02P 21/20; H02P 23/0031; H02P 6/08; G06F 30/15; G06F 30/17
See application file for complete search history.

(56) References Cited

U.S. PATENT DOCUMENTS

| 8,843,285 B2 | 9/2014 | Gratton et al. |
| 10,399,572 B2 | 9/2019 | Meehan et al. |
| 10,780,849 B1 | 9/2020 | Garcia et al. |

FOREIGN PATENT DOCUMENTS

| DE | 102012205522 A1 | 10/2013 | |
| DE | 102018125906 A1 * | 4/2019 | ............. B60K 35/00 |

OTHER PUBLICATIONS

German Search Report issued in application No. DE102022204344.8 dated Jan. 3, 2023 (12 pages).
Caterpillar. Cat 926M Wheel Loader Brochure AEHQ7361-03, Jun. 2020 (4 pages).

* cited by examiner

*Primary Examiner* — Michael J Zanelli
(74) *Attorney, Agent, or Firm* — Michael Best & Friedrich LLP

(57) ABSTRACT

A variable setting drivetrain for use with a vehicle including a controller in operable communication with an electric motor and configured to provide signals to the motor representative of a target output torque vector, where the controller is configured to calculate the target output torque vector by taking the weighted average of a first torque vector determined using a first output map, a second torque vector determined using a second output map, and a third torque vector determined using a third output map.

20 Claims, 2 Drawing Sheets

INFINITELY ADJUSTABLE DRIVETRAIN

FIELD OF THE INVENTION

The present application relates to an infinitely variable drivetrain for use with a piece of machinery and more specifically to a drivetrain that can model two or more operating styles and merge the styles to produce an infinitely variable torque output.

BACKGROUND

Different styles of drivetrains, such as eDrives, torque converter systems, and hydrostatic systems, produce different output vectors given a particular set of operating states.

SUMMARY

In some implementations, a variable setting drivetrain for use with a vehicle, the variable setting drivetrain including an electric motor having an output shaft, where the output shaft generates an output torque having an output torque vector, and a controller in operable communication with the electric motor and configured to output signals to the motor representative of a target output torque vector. Where the controller includes a memory unit configured to store a first output map, a second output map, and a first user input therein, where the first output map is configured to determine a first torque vector in response to a current vehicle speed and a current vehicle direction, where the second output map is different than the first output map and is configured to determine a second torque vector in response to the current vehicle speed and the current vehicle direction, and where the first user selection input includes a first output map utilization percentage and a second output map utilization percentage, and a processor in operable communication with the memory unit and the electric motor, where the processor is configured to determine the target output torque vector by calculating a weighted average of the first torque vector and the second torque vector.

In other implementations, a method of operating an adjustable drivetrain installed on a vehicle, where the adjustable drivetrain includes an electric motor with an output shaft generating an output torque having an output torque vector, a memory unit storing a first output map, a second output map, and a third output map, and a processor in operable communication with the memory unit and the electric motor. The method including selecting a drive mode by saving into memory a first output map utilization percentage, a second output map utilization percentage, and a third output map utilization percentage, calculating a first torque vector by inputting a first vehicle speed and a first vehicle direction into the first output map, calculating a second torque vector by inputting the first vehicle speed and first vehicle direction into the second output map that is different than the first output map, calculating a third torque vector by inputting the first vehicle speed and the first vehicle direction into the third output map that is different than the first output map and the second output map, calculating a first weighed torque vector by multiplying the first torque vector by the first output map utilization percentage, calculating a second weighted torque vector by multiplying the second torque vector by the second output map utilization percentage, calculating a third weighted torque vector by multiplying the third torque vector by the third output map utilization percentage, calculating a target torque vector by adding the first weighted torque vector, the second weighted torque vector, and the third weighted torque vector, outputting signals to the electric motor representative of the calculated target torque vector, producing an output torque representative of the output signals, and conveying the output torque to a driven element to propel the vehicle in a manner representative of the output torque.

In still other implementations, a vehicle subassembly for use with a vehicle, the vehicle subassembly including an electric motor having an output shaft, where the output shaft generates an output torque having an output torque vector, a controller in operable communication with the electric motor and configured to provide signals to the motor representative of a target output torque vector, where the controller includes a memory unit configured to store a first output map, a second output map, and a third output map therein, where the first output map is configured to determine a first torque vector in response to a current vehicle speed and a current vehicle direction, where the second output map is different than the first output map and configured to determine a second torque vector in response to the current vehicle speed and the current vehicle direction, and where the third output map is different than the first output map and the second output map and is configured to determine a third torque vector in response to the current vehicle speed and the current vehicle direction, and a first user selection interface configured to establish a first output map utilization percentage, a second output map utilization percentage, and a third output map utilization percentage, and where the first user selection interface includes a graphical interface visually displaying a plurality of nodes, and where each node is representative of a unique combination of the first map utilization percentage, the second map utilization percentage, and the third map utilization percentage.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

This disclosure generally relates to an infinitely variable drivetrain 10 for sure with a vehicle 14. More specifically, the drivetrain 10 includes some form of torque generator (e.g., an electric motor, a hydraulic motor, and the like) whose directed torque output is the result of a weighted average of the outputs of multiple output maps. The output maps, in turn, are configured to receive inputs generally corresponding to the current operating conditions of the vehicle and output a proposed torque vector. More specifically, each output map is configured to model a corresponding style or type of drivetrain, such as a torque converter system, an eDrive system, and/or a hydrostatic system. The controller of the drivetrain then combines the resulting proposed torque vectors—emphasizing and de-emphasizing the maps as set forth by the user—to produce a target output torque value. By utilizing information from multiple output maps, the user is able to adjust and blend the outputs from each of the saved maps to produce a custom feel and output style for a particular vehicle. The controller is also configured to utilize a graphical user interface to allow the user to easily and quickly change the resulting blend of outputs to modify the handling of the vehicle as the situation changes and develops.

Figure 1:
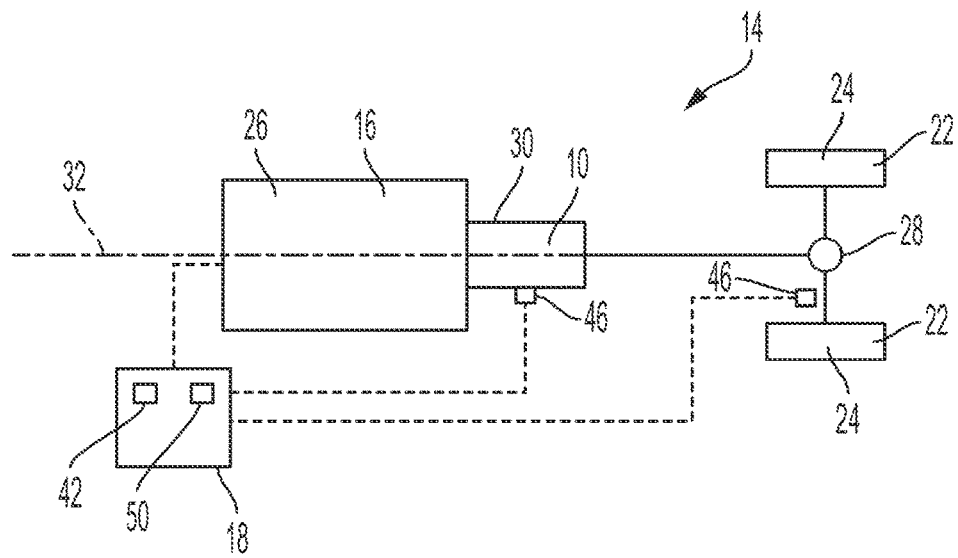
FIG. 1 is a schematic view of a vehicle having an infinitely variable drivetrain installed thereon.

FIG. 1 illustrates an infinitely variable drivetrain 10 for use with a vehicle 14, such as a piece of farm equipment, a piece of construction equipment, a lift, and the like. The drivetrain 10 includes a motor 16, a controller 18 in operable communication with the motor 16, and a driven element 22 in operable communication with the motor 16. In the illustrated embodiment, the driven element 22 includes a plurality of wheels 24 driven by the motor 16 via one or more differentials 28. However, in alternative embodiments, the drivetrain 10 may include multiple motors 16 each driving a single wheel or driven element 22. In still other embodiments, the driven element 22 may include other forms of conveyance such as, but not limited to, tracks, mecanum wheels, omni wheels, and the like.

The motor 16 of the drivetrain 10 is an electric motor having a stator or housing 26 and an output shaft 30 extending from and rotatable with respect to the housing 26 about a shaft axis 32. During use, the motor 16 is configured to receive electrical current (e.g., from the controller 18), causing the shaft 30 to rotate relative to the housing 26 and produce an output torque vector 34. For the purposes of this application, the output torque vector 34 generally includes a torque direction and torque magnitude. The output torque vector 34 of the output shaft 30, in turn, is then conveyed to the driven element 22 to convey the vehicle 14.

The controller 18 of the drive train 10 includes a processor 42, one or more sensors 46 in operable communication with the processor 42, and memory 50 to store data for use by the processor 42. During use, the processor 42 is configured to receive data from the one or more sensors 46, receive inputs from the user via a user interface 54, reference data and programs stored in the memory 50, process the data using one or more pre-determined algorithms, and output signals to the motor 16 to control the output torque vector 34.

In the illustrated embodiment, the one or more sensors 46 are configured to detect the current operating states of the vehicle 14, including the drivetrain 10, and output signals to the processor 42 corresponding to the detected states. Such operating states may include, but are not limited to, the speed the vehicle 14 is traveling, the direction the vehicle 14 is traveling, the current throttle input, the current brake input, the current inclination of the vehicle, the current power availability in the batteries (if electrically powered), the current steering angle, the current status of any present differentials or gears (e.g., locked, unlocked, and current gear ratios), and the like.

For example, in some embodiments the sensors 46 may include one or more sensors configured to detect the current speed and current direction the vehicle 14 is traveling. In such embodiments the sensors 46 may include a GPS sensor, physical sensors directly attached to the driven elements 22 of the vehicle 14, a virtual calculation based on virtual models of the vehicle 14 and/or drivetrain 10, electrical sensors in operable communication with the motor 16, and the like. In other embodiments, the one or more sensors 46 may also include sensors configured to detect and output signal representing the current output torque vector 34 of the motor 16, the present current and voltage load being applied to the motor 16, and the like. In still other embodiments, the one or more sensors 46 may include sensors attached to or configured to output additional states in the vehicle 14 and/or the drivetrain 10. While the illustrated sensors 46 are presented as separate physical elements, it is understood that in some embodiments the sensors 46 may be completely virtual such that the necessary information is compiled and provided to the processor 42 during use.

The controller 18 is also in operable communication with a user interface 54. The user interface 54 includes a screen, a keyboard, mouse, and the like to allow the user to both view information being output by the controller 18 and input data into the controller 18 to be conveyed to the processor 42. In the illustrated embodiment, the user interface 54 is a touch screen in operable communication with the processor 42, however in alternative embodiments the user interface 54 may include a LCD display, keyboard, mouse, microphone (for voice command), speaker, indicator bulbs, and/or some combination thereof. During use, the user interface 54, is configured to allow the user to select, among other things, the utilization percentage 70a, 70b, 70c for each output map 56a, 56b, 56c (described below).

The memory 50 of the controller 18 is configured to store a plurality of output maps 56a, 56b, 56c therein. During use, the processor 42 is configured to communicate with the output maps stored in the memory 50 by inputting a current set of vehicle operating states (e.g., vehicle speed, vehicle direction, throttle position, and the like) into the output map 56a, 56b, 56c whereby the output maps 56a, 56b, 56c return a pre-determined output torque vector. More specifically, each output map 56a, 56b, 56c includes an algorithm or look-up chart configured to model a particular type of drivetrain style. For example, in the illustrated embodiment, the first output map 56a is configured to model a "torque converter" style drivetrain (e.g., a drivetrain having a torque converter for conveying torque between a power source, such as an ICE, and the driven elements 22). As such, when the current operating states of the vehicle 14 are input into the first output map 56a by the processor 42, the first output map 56a is configured to output a first torque vector 60a (e.g., a first output direction and a first output torque magnitude) that generally corresponds with the torque vector a torque converter style drivetrain would have output to the driven elements 22 if it was subject to the same operating states.

Similarly, in the illustrated embodiment, the second output map 56b is configured to model an "eDrive" style drivetrain (e.g., a drivetrain where an electric motor is directly connected to the drive elements 22). As such, when the current operating states of the vehicle 14 are input into the second output map 56b by the processor 42, the second output map 56b is configured to output a second torque vector 60b (e.g., a second output direction and a second output torque magnitude) that generally corresponds with the torque vector an eDrive style drivetrain would have output if it was subject to the same operating states.

Furthermore, in the illustrated embodiment, the third output map 56c is configured to model a "hydrostatic drive" style drivetrain (e.g., a drivetrain where the driven elements 22 are directly driven by a hydraulic pump). As such, when the current operating states of the vehicle 14 are input into the third output map 56c by the processor 42, the third output map 56c is configured to output a third torque vector 60c (e.g., a third output direction and a third output torque magnitude) that generally corresponds with the torque vector a hydrostatic drive style drivetrain would have output if it was subject to the same operating states.

While the above described output maps 56a, 56b, 56c all model an existing physical style of drivetrain, it is also understood that additional output maps may be stored in the memory 50 of the controller 18. For example, in some embodiments one or more output maps may be crafted to produce a unique set of outputs based on desired operating characteristics and may not actually model or correspond to any existing form of drivetrain. Such output maps may eliminate certain operating characteristics that are viewed as undesirable and/or emphasize certain operating characteristics viewed as good or necessary. In still other embodiments, customized maps may be developed that modify a map modeling to physical drivetrain style to eliminate or emphasize particular attributes that drivetrain style contains. In still other embodiments, a plurality of unique, customized output maps may be stored in the memory 50 for use by the processor 42 during use.

During use, the processor 42 is configured to receive a stream of data from the one or more sensors 46 generally representing the current operating states of the vehicle 14. The processor 42 is also configured to receive a set of utilization percentages 70a, 70b, 70c, input by the user via the user interface 54. Each utilization percentage 70a, 70b, 70c is associated with a corresponding output map 56a, 56b, 56c in the memory 50.

Figure 2:
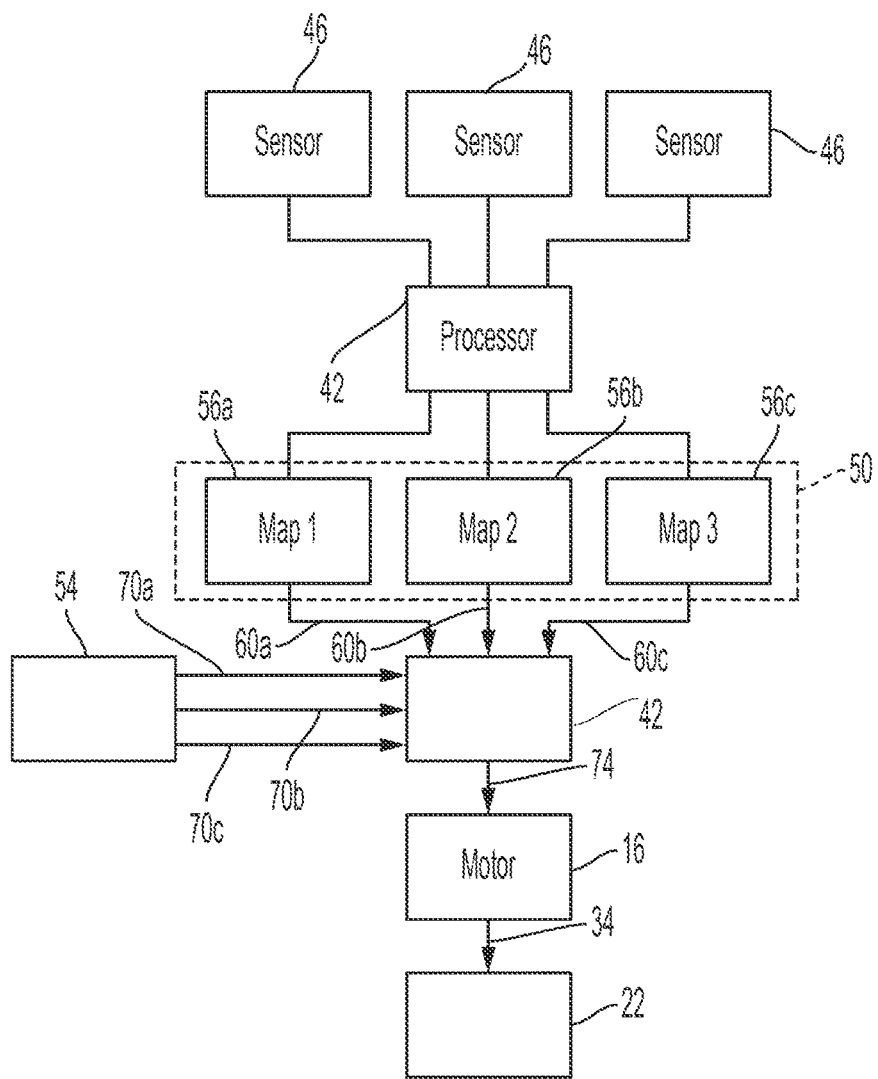
FIG. 2 is a flow chart illustrating the operations of the infinitely variable drivetrain of FIG. 1.

As the processor 42 receives the stream of data from the one or more sensors 46, the processor 42 is configured to forward the operating states received by the sensors 46 into each of the output maps 56a, 56b, 56c (see FIG. 2). The output maps 56a, 56b, 56c, in turn, each process the operating states, as described above, and output a corresponding output torque vector to the processor 42. More specifically, the first output map 56a outputs a first output torque vector 60a, the second output map 56b outputs a second torque vector 60b, and the third output map 56c outputs a third torque vector 60c.

Upon receiving the first, second, and third output torque vectors 60a, 60b, 60c from the output maps 56a, 56b, 56c, the processor 42 is then configured to compile the output torque vectors 60a, 60b, 60c in accordance with the user selected utilization percentages 70a, 70b, 70c to produce a target torque vector 74. In the illustrated embodiment, the processor 42 combines the output torque vectors 60a, 60b, 60c using a weighted average to calculate the target torque vector 74. For example:

$$[60a]*[70a]+[60b]*[70b]+[60c]*[70c]=[\text{Target Torque Vector 74}]$$

With the target torque vector 74 calculated, the processor 42 then outputs electrical signals to the motor 16 so that the output torque vector 34 of the output shaft 30 substantially corresponds with the target torque vector 74. The processor 42 continuously cycles through the above stages during the operation of the vehicle 14 so that the target torque vector 74, and the output torque vector 34 of the shaft 30, continuously update and correspond with the changes to the operating states.

Furthermore, in instances where the user changes the selected utilization percentages 70a, 70b, 70c during operation, the processor 42 is configured to correspondingly adjust the elements of the target torque vector 74 calculation. By doing so, the user is able to continuously and infinitely adjust the manner in which the vehicle 14 behaves during operation by changing to what extent each drivetrain type is emphasized. In instances where a user wishes for the vehicle 14 to act more like a vehicle having a torque converter, the user can select, via the user interface 54, to increase the utilization percentage for the first output map 56a that generally corresponds with the operational outputs of a torque converter. Similarly, if the user wishes to emphasize an eDrive or hydrostatic drive, the user may choose to increase the utilization percentages of the eDrive or the hydrostatic drive maps (e.g., the second output map 56b, or the third output map 56c, respectively) while correspondingly lowering the utilization percentage of the torque converter map (e.g., the first output map 56a).

In the illustrated embodiment, the user interface 54 is configured so that the utilization percentages add up to 100%. For example, a "hydrostatic" mode of operation would allow for 100% utilization of the hydrostatic map 56c and 0% utilization of the torque converter map 56a and the eDrive map 56b. In another example, if the user wishes to have an evenly blended operating condition, the user may select 33% utilization for all three maps 56a, 56b, 56c.

The current controller 18 also permits the user to select any utilization percentage between −100% to 200% for a given output map. When doing so, a 100% utilization is considered a 1:1 analog for the type of drivetrain system selected. In instances where a "negative" utilization is selected, the controller 18 is configured to output signals opposite to what the specific drivetrain would output. For example, if a certain set of operating states would cause an eDrive drivetrain to output a 100 Nm torque in a clockwise direction, a −50% utilization percentage would result in the corresponding eDrive target torque value being 50 Nm in an anti-clockwise direction. This calculation would then be combined with the remaining output maps to produce an overall target torque vector 74 as described above. Operations with a negative utilization percentage are considered "anti-drive" conditions (e.g., anti-hydrostatic; anti-eDrive; and anti-torque converter).

In contrast, utilization percentages greater than 100% (e.g., between 100% and 200%) would be considered "super-drive" conditions causing the controller 18 to operate in the same general manner in which the underlying drivetrain would operate but with increased torque values. For example, if a certain set of operating states would result in the corresponding eDrive target torque value being 100 Nm in a clockwise direction, a 200% utilization percentage would result in the corresponding eDrive target torque being 200 Nm in a clockwise direction. This calculation would then be combined with the remaining output maps to produce an overall target torque vector 74 as described above.

While the above descriptions include three maps 56a, 56b, 56c, it is understood that in alternative embodiments two maps or more than three maps may also be present in the memory 50. In such embodiments, the combined utilization percentages would still add up to 100% overall with each individual map being adjustable between −100% and 200% utilization. Furthermore, in instances where more than two maps are present, it is also understood that some maps may be "turned off" such that the receive a utilization percentage of 0%.

Still further, while the illustrated embodiment describes the controller 18 providing electrical current to an electrical motor 16 to produce the target torque vector 74, it is understood that in alternative embodiments a hydraulic or other form of torque generation may be used to generate the output torque 34. In such instances, the controller 18 would output the necessary type of signal so that the torque generation element would produce the needed output torque 34.

Figure 3:
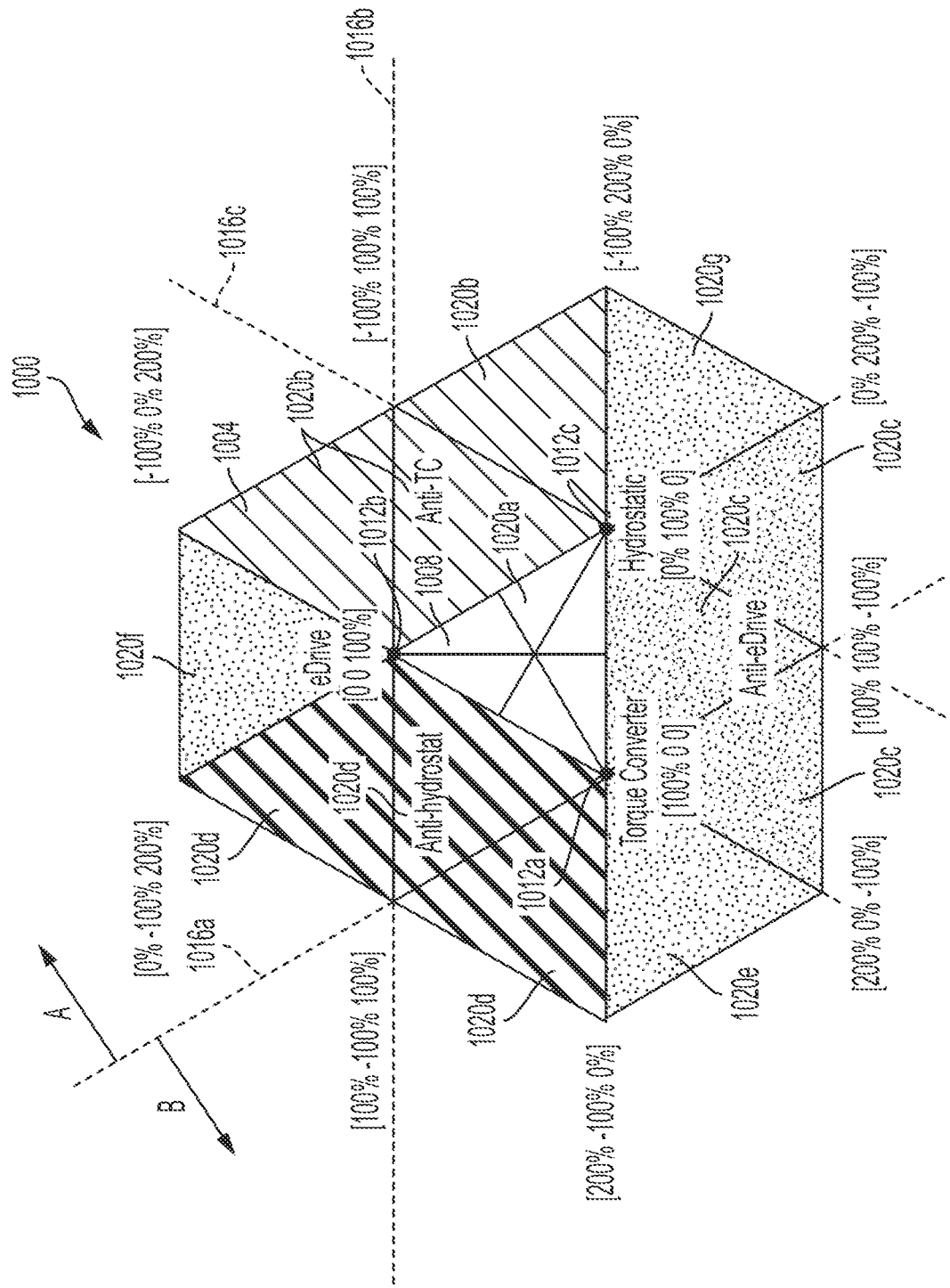
FIG. 3 illustrates a graphical interface for use with the infinitely variable drivetrain of FIG. 1.

FIG. 3 illustrates a graphical user interface 1000 for use with the infinitely adjustable drivetrain 10 described above. During use, the graphical user interface 1000 is displayed on the user interface 54 whereby the user can select each of the utilization percentages 70a, 70b, 70c with a single input. More specifically, the graphical user interface 1000 includes a grid 1004 of points 1008 whereby each point 1008 represents a combined set of utilization percentages 70a, 70b, 70c that add up to 100%. By selecting a single point 1008 (e.g., by touching the screen at the point's location or using a curser to select a point), the user is able to select all three utilization percentages 70a, 70b, 70c with a single selection. The layout of the grid 1004 also provides a more intuitive environment for the user as moving the selected location in a particular direction causes the utilization percentages 70a, 70b, 70c to all rise and fall proportionally and geometrically.

In the illustrated embodiment, the grid 1004 is substantially "triangular" to correspond with the three output maps 56a, 56b, 56c. More specifically, the grid 1004 includes three "home points" 1012a, 1012b, 1012c, each corresponding to a combination of utilization percentages 70a, 70b, 70c that are intended to produce a 1:1 analog of a particular map. For example, the first home point 1012a produces a 100% utilization of the torque converter map 56a and 0% utilization of the eDrive and hydrostatic maps 56b, 56c. Furthermore, the second home point 1012b produces 100% utilization of the eDrive map 56b while having 0% utilization of the hydrostatic and torque converter maps 56a, 56c. Finally, the third home point 1012c produces 100% utilization of the hydrostatic map 56c while having 0% utilization of the converter map 56a and the eDrive map 56b. Generally speaking, the first, second, and third home points 1012a, 1012b, 1012c, produce a 1:1 analog of the torque converter, the eDrive, and the hydrostatic drive, respectively.

The grid 1004 also includes three home axis 1016a, 1016b, 1016c that pass through their corresponding home points 1012a, 1012b, 1012c. Each home axis 1016a, 1016b, 1016c illustrate all possible utilization percentage combinations where the home map is at 100%. For example, the first home axis 1016a represents all possible utilization percentages where the first torque converter map 56a has a utilization percentage of 100%.

Graphically, moving the selected point perpendicular to a home axis 1016a, 1016b, 1016c causes the utilization percentage 70a, 70b, 70c of the corresponding map 56a, 56b, 56c to change. For example, moving the selected point in the first direction A relative to the first home axis 1016a causes the utilization percentage of the first torque converter map 56a to decrease. In contrast, moving the selected point in the second direction B relative to the first home axis 1016a causes the utilization percentage of the first torque converter map 56a to increase. This same dichotomy holds true for each home axis 1016b, 1016c and their corresponding maps 56b, 56c, respectively. As such, the utilization percentages for each point in the grid 1004 is the result of the points combined distances from each of the three home axes 1016a, 1016b, 1016c.

Together, the three home points 1012a, 1012b, 1012c and the three home axis 1016a, 1016b, 1016c produce a plurality or equilateral triangles or regions 1020. All the points 1008 within a respective region, in turn, shares some common operational attributes.

For example, all points 1008 in the first region 1020a between the three home points 1012a, 1012b, 1012c, include utilization percentage combinations where each entry is between 0% to 100%. This results in standard blended operations. In contrast, the points 1008 within the second region 1020b all correspond with points 1008 where anti-torque converter operations are present (e.g., where the first utilization percentage is negative). Similar attributes are present in the third and fourth regions 1020c, 1020d with respect to anti-eDrive and anti-hydrostat drive, respectively. Finally, the fifth, sixth, and seventh regions 1020e-g generally correspond with "super-drive" operations where the torque converter, eDrive, and hydrostat drive utilization percentages are greater than 100%, respectively.

In all, the graphical layout of the grid 1004 and the points 1008 contained therein provide the user with an easy to use graphical interface that still displays all possible combinations of the utilization percentages. While the illustrated embodiment includes three home points and home axes corresponding with three active output maps, it is understood that in alternative embodiments more or fewer home points and home axes may be present to accommodate more or fewer output maps. Still further, in some embodiments the interface 1000 may be configured so that a sub-group of three output maps may be selected from a group greater than three for use in the grid 1004.

The invention claimed is:

1. A variable setting drivetrain for use with a vehicle, the variable setting drivetrain comprising:
   an electric motor having an output shaft, wherein the output shaft generates an output torque having an output torque vector; and
   a controller in operable communication with the electric motor and configured to output signals to the motor representative of a target output torque vector, wherein the controller includes:
      a memory unit configured to store a first output map, a second output map, and a first user input therein, wherein the first output map is configured to determine a first torque vector in response to a current vehicle speed and a current vehicle direction, wherein the second output map is different than the first output map and is configured to determine a second torque vector in response to the current vehicle speed and the current vehicle direction, and wherein the first user selection input includes a first output map utilization percentage and a second output map utilization percentage, and
   a processor in operable communication with the memory unit and the electric motor, wherein the processor is configured to determine the target output torque vector by calculating a weighted average of the first torque vector and the second torque vector.

2. The variable setting drivetrain of claim 1, wherein the processor is configured to calculate the weighted average by multiplying the first torque vector by the first utilization percentage and multiplying the second torque vector by the second map utilization percentage.

3. The variable setting drivetrain of claim 1, wherein the first output map utilization percentage and the second output map utilization percentage add up to 100%.

4. The variable setting drivetrain of claim 1, wherein the memory unit is configured to store
   a third output map configured to determine a third torque vector in response to the current vehicle speed and the current vehicle direction, wherein the third output map is different than the first output map and the second output map, wherein the first user selection stored in the memory unit includes a third output map utilization percentage, and wherein the processor is configured to determine the target output torque vector by calculating the weighted average of the first torque vector, the second torque vector, and the third torque vector.

5. The variable setting drivetrain of claim 4, wherein the processor is configured to calculate the weighted average by multiplying the first torque vector by the first utilization percentage, multiplying the second torque vector by the second map utilization percentage, and multiplying the third torque vector by the third map utilization percentage.

6. The variable setting drivetrain of claim 4, wherein the third output map is configured to model the operational capabilities of one of a torque converter, an eDrive, and a hydrostatic drive.

7. The variable setting drivetrain of claim 4, wherein the first output map utilization percentage, the second output map utilization percentage, and the third output map utilization percentage add up to 100%.

8. The variable setting drivetrain of claim 1, wherein the first output map is configured to model the operational capabilities of one of a torque converter, an eDrive, and a hydrostatic drive.

9. The variable setting drivetrain of claim 8, wherein the second output map is configured to model the operation capabilities of another of the torque converter, an eDrive, and a hydrostatic drive different than the first output map.

10. The variable setting drivetrain of claim 1, wherein the first output map utilization percentage may be set to any value between −100% and 200%.

11. The variable setting drivetrain of claim 10, wherein the second output map utilization percentage may be set to any value between −100% and 200%.

12. A method of operating an adjustable drivetrain installed on a vehicle, wherein the adjustable drivetrain includes an electric motor with an output shaft generating an output torque having an output torque vector, a memory unit storing a first output map, a second output map, and a third output map, and a processor in operable communication with the memory unit and the electric motor, the method comprising:
   selecting a drive mode by saving into memory a first output map utilization percentage, a second output map utilization percentage, and a third output map utilization percentage;
   calculating a first torque vector by inputting a first vehicle speed and a first vehicle direction into the first output map;
   calculating a second torque vector by inputting the first vehicle speed and first vehicle direction into the second output map that is different than the first output map;
   calculating a third torque vector by inputting the first vehicle speed and the first vehicle direction into the third output map that is different than the first output map and the second output map;
   calculating a first weighed torque vector by multiplying the first torque vector by the first output map utilization percentage;
   calculating a second weighted torque vector by multiplying the second torque vector by the second output map utilization percentage;
   calculating a third weighted torque vector by multiplying the third torque vector by the third output map utilization percentage;
   calculating a target torque vector by adding the first weighted torque vector, the second weighted torque vector, and the third weighted torque vector;
   outputting signals to the electric motor representative of the calculated target torque vector;
   producing an output torque representative of the output signals; and
   conveying the output torque to a driven element to propel the vehicle in a manner representative of the output torque.

13. The method of claim 12, wherein selecting a drive mode includes having the first output map utilization percentage, the second output map utilization percentage, and the third output map utilization percentage add up to 100%.

14. The method of claim 12, wherein establishing the first output map utilization percentage, the second output map utilization percentage, and the third output map utilization percentage includes selecting an output map utilization percentage between −100% and 200%.

15. The method of claim 14, wherein selecting a drive mode includes having the first output map utilization percentage, the second output map utilization percentage, and the third output map utilization percentage add up to 100%.

16. The method of claim 14, wherein selecting the drive mode includes selecting the drive mode from a graphical chart visually representing a plurality possible drive mode combinations.

17. The method of claim 16, wherein the graphical chart includes a graphical matrix with a plurality of nodes displayed thereon, and wherein each node represents a unique combination of the first output map utilization percentage, the second output map utilization percentage, and the third output map utilization percentage.

18. A vehicle subassembly for use with a vehicle, the vehicle subassembly comprising:
   an electric motor having an output shaft, wherein the output shaft generates an output torque having an output torque vector;
   a controller in operable communication with the electric motor and configured to provide signals to the motor representative of a target output torque vector, wherein the controller includes a memory unit configured to store a first output map, a second output map, and a third output map therein, wherein the first output map is configured to determine a first torque vector in response to a current vehicle speed and a current vehicle direction, wherein the second output map is different than the first output map and configured to determine a second torque vector in response to the current vehicle speed and the current vehicle direction, and wherein the third output map is different than the first output map and the second output map and is configured to determine a third torque vector in response to the current vehicle speed and the current vehicle direction; and
   a first user selection interface configured to establish a first output map utilization percentage, a second output map utilization percentage, and a third output map utilization percentage, and wherein the first user selection interface includes a graphical interface visually displaying a plurality of nodes, and wherein each node is representative of a unique combination of the first map utilization percentage, the second map utilization percentage, and the third map utilization percentage.

19. The vehicle subassembly of claim 18, the first map utilization percentage, the second map utilization percentage, and the third map utilization percentage for each node add up to 100%.

20. The vehicle subassembly of claim 18, wherein each of the first map utilization percentage, the second map utilization percentage, and the third map utilization percentage can vary between −100% to 200%.

* * * * *